US008620839B2

(12) United States Patent
Bhatnagar et al.

(10) Patent No.: US 8,620,839 B2
(45) Date of Patent: Dec. 31, 2013

(54) MARKOV MODELING OF SERVICE USAGE PATTERNS

(75) Inventors: Karan Bhatnagar, Hyderabad (IN); Rohan Khot, Guwahati (ID)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 13/413,884

(22) Filed: Mar. 7, 2012

(65) Prior Publication Data

US 2012/0254080 A1    Oct. 4, 2012

Related U.S. Application Data

(63) Continuation of application No. 13/157,006, filed on Jun. 9, 2011.

(30) Foreign Application Priority Data

Mar. 8, 2011   (IN) ............................. 953/CHE/2011

(51) Int. Cl.
*G06F 15/18* (2006.01)
(52) U.S. Cl.
USPC ........................................................... 706/12
(58) Field of Classification Search
None
See application file for complete search history.

(56) References Cited

U.S. PATENT DOCUMENTS

| 6,012,052 A | 1/2000 | Altschuler et al. |
| 6,549,896 B1 | 4/2003 | Candan et al. |
| 2007/0005646 A1* | 1/2007 | Dumais et al. ............. 707/104.1 |
| 2007/0198321 A1 | 8/2007 | Lakshminarayan et al. |
| 2011/0273470 A1* | 11/2011 | Ohba et al. .................... 345/619 |
| 2012/0011153 A1* | 1/2012 | Buchanan et al. ............ 707/771 |

OTHER PUBLICATIONS

"Prediction of user navigation patterns by mining the temporal web usage evolution", Vincent S. Tseng • Kawuu Weicheng Lin • Jeng-Chuan Chang; Published online: May 23, 2007 © Springer-Verlag 2007.*
Cadez, et al. "Visualization of Navigation Patterns on a Web Site Using Model-Based Clustering." Proceedings of the sixth ACM SIGKDD international conference on Knowledge discovery and data mining, pp. 280-284.
Ocone, Daniel. "Markov Chain Models." http://www.math.rutgers.edu/courses/338/coursenotes/chapter5.pdf. Date visited: Mar. 21, 2012. pp. 1-20.
WIPO,"International Search Report", for Application No. PCT/US2012/029820 filed Mar. 20, 2012, Oct. 23, 2012.

* cited by examiner

*Primary Examiner* — Kakali Chaki
*Assistant Examiner* — Luis Sitiriche
(74) *Attorney, Agent, or Firm* — Morris & Kamlay LLP

(57) ABSTRACT

A system for analyzing service usage utilizing Markov models. Records of client requests to the service are extracted from at least one log. The records are grouped by client and sorted by timestamp. A pattern of requests that form an action is detected. Each action has a time. A probability is calculated of a transition from a precedent action to a subsequent action, where the precedent action has a time prior to the subsequent action. A delay time is also calculated between a precedent action and a subsequent action. A probability is calculated for a delay time, such as the likelihood that a delay from a precedent action to a subsequent action will fall within a given time interval.

28 Claims, 2 Drawing Sheets

MARKOV MODELING OF SERVICE USAGE PATTERNS

CROSS-REFERENCE TO RELATED APPLICATIONS

This application is a continuation of U.S. patent application Ser. No. 13/157,006 filed Jun. 9, 2011, which claims priority to Indian Patent Application No. 953/CHE/2011, filed Mar. 28, 2011.

BACKGROUND OF THE INVENTION

Log analysis (or system and network log analysis) can generate information about how a system is used. A log can include one or more computer-generated records of events that occur in a system, such as page visits, Remote Procedure Calls (RPCs) and downloads. The results of log analysis can help to improve compliance with security policies, perform audits of system usage, aid in system troubleshooting and assist in responding to security incidents.

Logs are emitted by network devices, operating systems, applications and different kinds of intelligent or programmable devices. A log can include a stream of messages ordered by the time at which events occur or are recorded. Logs may be directed to files, stored on disk, or directed as a network stream to a log collector.

The usage of a service usage can be measured by the number of occurrences of given individual events, such as page visits, Remote Procedure Calls, etc. Such individual events can be stored in a log and can be analyzed in view of the source of a request or call, its frequency, the times of day the event occurred and so on. The results of the analysis can help spot usage trends, such as the popularity of a given web page, the amount of time spent by a user on a page and the time of day when an RPC receives the most usage.

SUMMARY OF THE INVENTION

System usage can be analyzed and presented as a Markov model. Records of client requests to the service can be extracted from at least one log. The records can be grouped by client and sorted by timestamp. A pattern of requests that form an action can be detected using one or more pattern matching systems. Each action has a time. A probability of a transition from a precedent action to a subsequent action can be calculated, where the precedent action has a time prior to the subsequent action. A delay time can also be calculated between a precedent action and a subsequent action. A probability can be calculated for a delay time, such as the likelihood that a delay from a precedent action to a subsequent action will fall within a given time interval. The results can be presented as a Markov model with nodes representing actions and each edge representing a transition from the actions that it connects. Each edge can be labeled with the probability of the transition. A probability distribution of the delay for that transition can also be shown with the edge.

DETAILED DESCRIPTION

Figure 1:
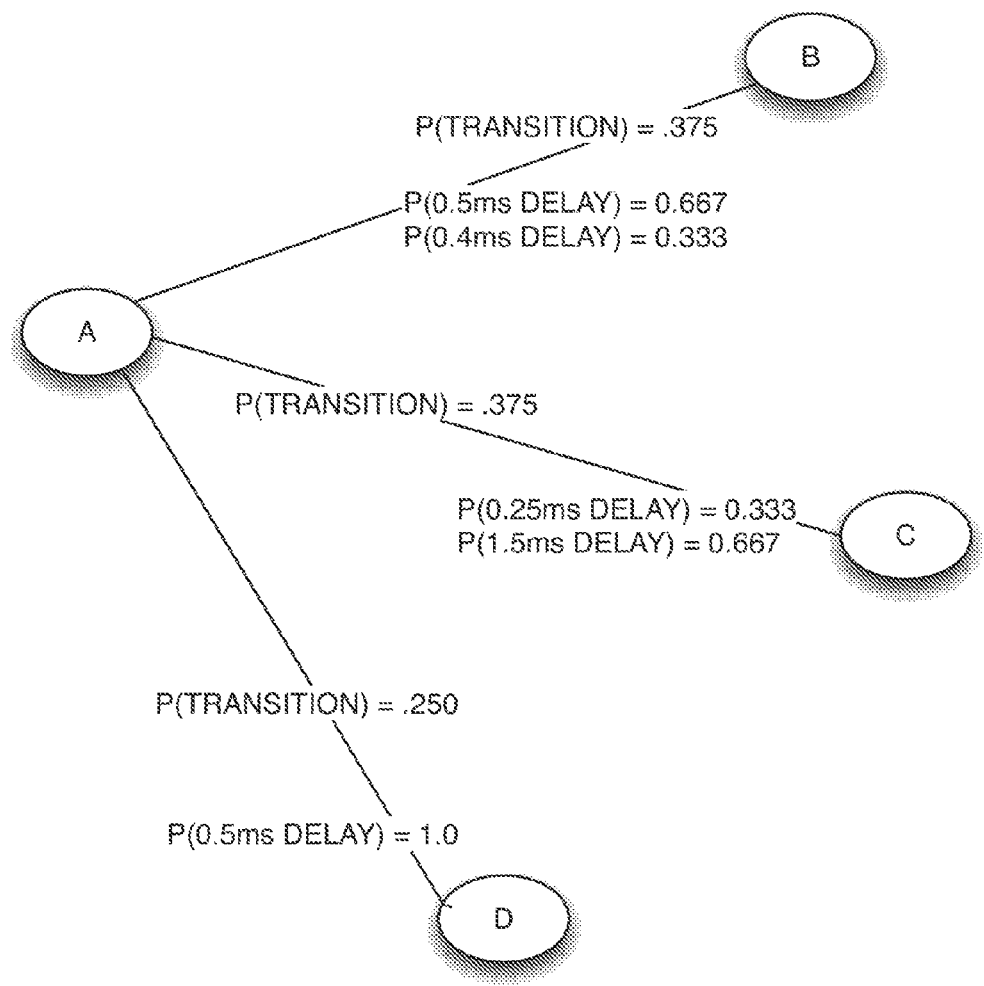
FIG. 1 shows a Markov model of usage according to the presently described subject matter.

Although analyzing individual events (e.g., RPC calls) in logs can help to identify certain usage rates and trends, it can be useful to understand the higher-level actions that are made of collections of individual events. For example, the action opening a user interface can be the result of a set of individual requests that operate together to cause the action to occur. One action can be followed by one or more subsequent actions. For example, after a user interface is open, subsequent actions can include opening an e-mail message, composing and sending reply message, forwarding the message, etc. It would be useful to understand sequences of actions to better configure and optimize a service.

Sets of related actions can be better understood in terms of the probability that a given action ("Action A") will be followed by another action ("Action B" or "Action C"). For example, after an e-mail message is opened, it would be informative to know that there is, say, a 0.66 probability that the e-mail message will be closed, a 0.24 probability that a reply-to message will be opened and a 0.2 probability that a forward-to message will be opened.

It would also be informative to understand the time delay between actions. For example, it would be informative to know that, say, there is a 0.8 probability that there is a delay of less than 0.9 ms between the time an e-mail message is sent and the time an autoreply message is received, and a 0.2 probability that the delay is greater than 0.9 ms.

Techniques of the described subject matter can extract higher-level actions from chains of requests from usage logs. For example, an entry in a log may be a,b,b,a,a,b,b,b,a,b,b, which shows a repeat pattern "a,b,b", indicating that these three requests may signify a higher level action, such as opening a user interface. Examples of actions for e-mail include open email UI, compose email, send email, save draft, view inbox, etc. For contact management, examples of actions include add contact, delete contact, add contact to group, etc. An airline flight booking system can have actions such as search for options, show detailed view of option, switch to previous/next date, go-back, book ticket, etc. Examples of online shopping actions include search item, modify criteria, next-page, go back to previous page, buy item, add to wishlist, etc. Groups of actions (such as next-page+modify-price_range) can be clustered to form higher level actions.

The system can generate a Markov model, which can be a state transition diagram. The nodes of the diagram are actions, i.e., states, such as "create profile", "read profile", "delete profile", etc. The edges between the nodes can show the probabilities of transitions between the actions. For example, an edge from action A to action B shows the probability that action A will transition to action B. The edges can also show a probability distribution of the time between action A and action B when a transition occurs.

A log file can contain numerous logs. The client or user identifier and atomic request can be extracted from the logs. As used herein, the term "client" can refer to any entity that is a source of requests or can be associate with a source of requests, such as a client, a user, a process, etc. An atomic request can be a low level request that a service can receive. For example, for an RPC call, the atomic request is the RPC payload. For a frontend service, the atomic request can be the HTTP request parameters. The atomic request from a log entry can be extracted using logic in a configuration file that specifies the fields of logs that should be considered, or a piece of code that takes a log entry as an input and returns the atomic request data. Chains of atomic requests can be sorted by timestamp for a given user. Pattern extraction algorithms can then be used to extract frequently occurring atomic requests into higher level actions.

The logs in a log file can be analyzed to extract client identifiers, atomic requests and timestamps. Thus, Each Log Entry→><clientID,AtomicRequest,timestamp>

These sets of information can be grouped according to clientID. Each subset grouped according to clientID can be sorted by timestamp.

Each sorted, grouped subset can be analyzed to predict one or more clusters of one or more high level actions. This can be done by using N-gram models, FP-growth models, or any suitable pattern detection technique. This yields chains of <action, timestamp> pairs for each client. For actions made of numerous log entries, the timestamp for the action can be the timestamp for first log entry, for the last log entry, for an average time of all of the timestamps of the entries, or any other suitable time. For example, consider a set of (time,log) entries: (123, a), (124, b), (125, a), (126, c), (127, b). Suppose that 'aba' is a higher level action A, 'cb' is higher level action B. After pattern extraction, the timestamps for higher level actions can be (123, A), (126, B). Each per-client chain can be analyzed and multiple key value pairs of the form <action A, <action B, delaytime>> are produced across all or some of the clients. Each such key value pair indicates that action B (succeeding action) follows action A (preceding action) with a delay equal to delaytime after action A.

The set of key value pairs for an action can then be analyzed to generate probabilities for state transitions. For example, consider the following set of <action, delay> key value pairs for preceding action, Action A:

{<B, 0.5>, <C, 0.25>, <B, 0.4>, <C, 1.5>, <D, 0.2>, <D, 0.5>, <B, 0.5>, <C, 1.5>}, where the delay is in milliseconds.
The probability of transitions from A to each state B, C and D can be calculated as follows:

$$\text{Probability} = \frac{\text{Number of Transitions to State } X}{\text{Total Number of Transitions to All States}}$$

Thus, for example, $$\text{Probability to } B = \frac{3}{8} = 0.375$$

$$\text{Probability to } C = \frac{3}{8} = 0.375$$

$$\text{Probability to } D = \frac{2}{8} = 0.250$$

The probabilities of delay can be calculated for each transition. For example, the probability of a delay Y for a transition to a given State can be calculated by:

$$\text{Probability of Delay } Y = \frac{\text{Number of Delays at } Y}{\text{Total Number of Transitions to State}}$$

where Y is a delay value or range of delay values. For example, if the set of delays for transition from Action A to Action B is {0.5 ms, 0.4 ms, 0.5 ms}; to Action C is {0.25 ms, 1.5 ms, 1.5 ms}; and to Action D {0.5 ms}, then:

Probabilities of Delays to Action B: 0.5 ms=0.667; 0.4 ms=0.333.

Probabilities of Delays to Action C: 0.25 ms=0.333; 1.5 ms=0.667

Probability of Delay to Action D: 0.5 ms=1.0

Delay times can be expressed as a range, such as occurring in the intervals [0.1 ms, 0.3 ms); [0.3, 0.5 ms); etc., powers of 2 from an initial value to a final value, e.g., in intervals such as [10 ms, 16 ms); [16 ms, 32 ms); [32 ms, 64 ms) and [64, 100 ms]. Here, the initial value is 10 ms and the final value is 100 ms.

A Markov model with nodes representing actions (states) and edges labeled with transition and delay probabilities can be produced based upon the foregoing calculations for a given system. Such a model for the above example is shown in FIG. 1.

Markov models representing sets of client can also be generated. Sets of Actions grouped by clients can be segregated to enable different types of analysis. For example, the <Action A, <Action B, delaytime>> data can be grouped by various attributes, such as the geographical location of clients (all clients in New York State); by date; by a time of day or a range of time of day; by network or subnetwork; by source address; by protocol or protocol version; etc.

Various embodiments may include or be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the described subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the described subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the technique in accordance with the described subject matter in hardware and/or firmware. The processor may be coupled to memory, such as RAM, ROM, flash memory, a hard disk or any other device capable of storing electronic information. The memory may store instructions adapted to be executed by the processor to perform the technique in accordance with an embodiment of the described subject matter.

Any of the functionality described herein may be implemented by modules, which can be software, hardware and/or a combination thereof. A module can perform a single function, multiple functions or a function may be partially performed by each of a number of modules. For example, signature and domain validation may be performed by two dedicated modules or by a single module capable of performing both functions. Further, the domain validator and the signature validator module may run on different machines that may be controlled by different parties. Likewise, the system for storing customer domains and generated tickets may be implemented as Software as a Service (SaaS) in the cloud. The data may be stored in a single database, in a single table, in multiple tables, in multiple databases or in one or more distributed databases. The functionality thereof may be implemented using virtualized machines across multiple computers and data centers in multiple locations. The data stores and databases may be monolithic or distributed across numerous machines and locations.

Figure 2:
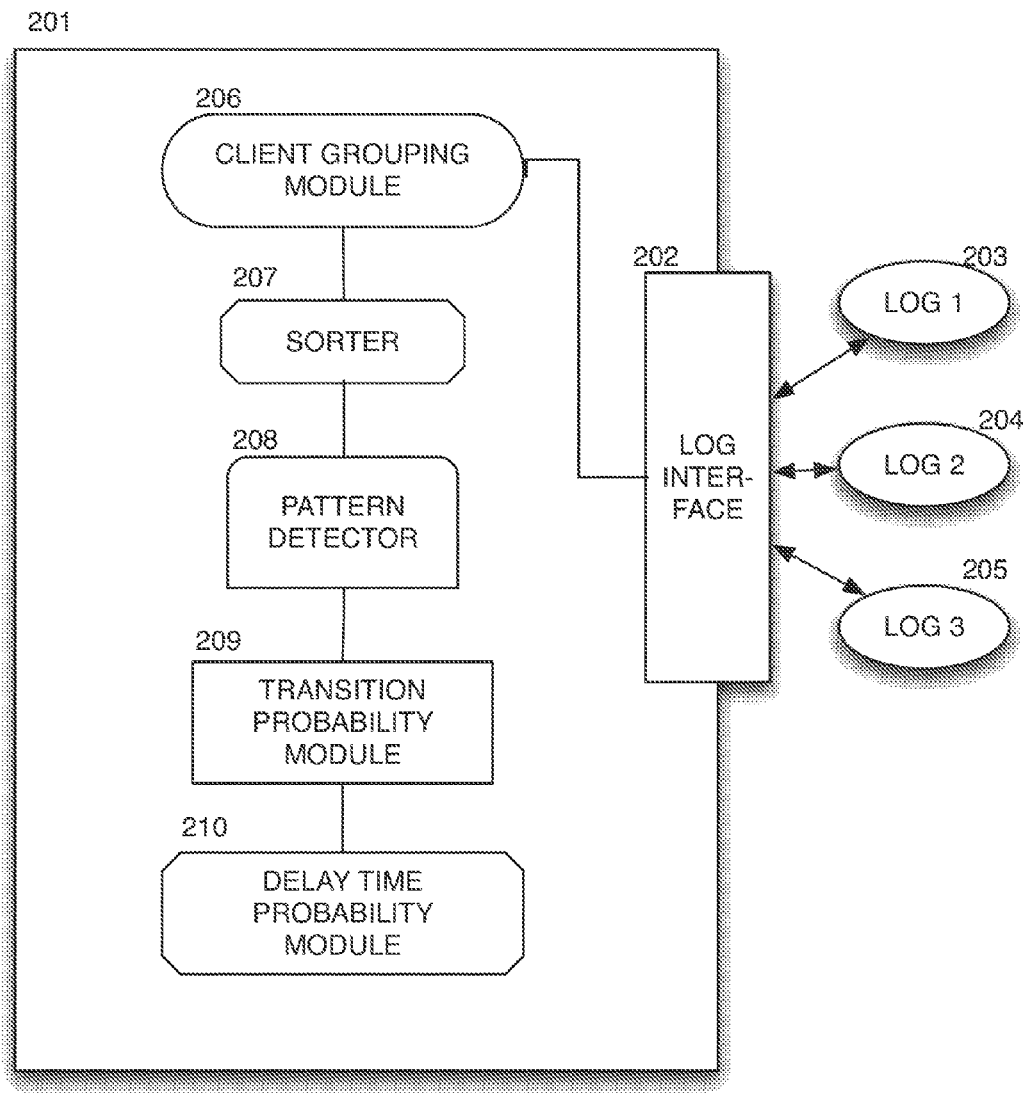
FIG. 2 shows components for generating Markov usage models according to an embodiment of the described subject matter.

FIG. 2 shows a Markov modeling system 201. Log interface 202 extracts a plurality of records from logs 203, 204 and 205. Each record can have at least one request and a timestamp. The log interface 202 can be in communication with a client grouping module 206 that groups the extracted records by client. The grouped records are sorted by sorter 207, which sorts group of client records by timestamp. A patter detector 208 detects a set of requests in at least one record in the sorted group that form a pattern that constitutes a higher-level action. For action, a series of HTTP requests can together open a user interface in a SaaS application. The action ("Open UI") can thus be assigned to that set of requests. Each action has a time. A transition probability module 209 calculates the probability of a transition from a precedent action to a subsequent action. A precedent action is an action that has a time prior to the time of a subsequent action.

Examples provided herein are merely illustrative and are not meant to be an exhaustive list of all possible embodiments, applications, or modifications of the described subject matter. Thus, various modifications and variations of the described techniques and systems of the described subject matter will be apparent to those skilled in the art without departing from the scope and spirit of the described subject matter.

For example, the disclosed subject matter is not restricted to the analysis of HTTP logs of a UI server. It can also be used, for example, for backend systems, such as those designed to serve RPC requests. Similarly to the examples cited above, low level action corresponding to a RPC log can be obtained based on the RPC request-name and payload information for backend systems. For example, consider an RPC server which serves following requests:
GetItemList: returns List<Item>
UpdateItem(Item item, integer quantity): returns void
RemoveItem(Item): returns void
In this case, the GetItemList, UpdateItem, RemoveItem procedure calls made by a remote client over the network can be the low level requests. The series of these low level requests when grouped by client-id, sorted by timestamp and analyzed for patterns can be processed into Markov models of high level client-access scenarios, in much the same way as described above. The Markov models can be used to help optimize the server, e.g., by suggesting more efficient ways of prefetching, caching or buffering writes to a disk.

Although the subject matter herein has been described in connection with specific embodiments, it should be understood that the described subject matter as claimed should not be unduly limited to such specific embodiments. Indeed, various modifications of the described modes for carrying out the described subject matter which are obvious to those skilled in the relevant arts or fields are intended to be within the scope of the appended claims.

What is claimed is:
1. A computer-implemented method, comprising:
extracting a plurality of records from at least one log, each record having a timestamp and at least one request;
detecting an action comprising a pattern of requests, where the action has a time and the action relates to a request for content by a client, wherein the detecting an action is performed on each of the extracted records;
generating a chain of action and timestamp pairs based on the detected action;
analyzing the generated chain of action and timestamp pairs;
based on the results of the analysis, producing key value pairs, wherein the key value pairs include at least a preceding action indicator as a first value of a key value pair, and as a second value of a key value pair being a combination of a succeeding action indicator and a delay time, wherein the delay time is equal to a delay of the succeeding action following the preceding action;
calculating, by a processor, the probability of a transition from a precedent action represented by the first value of the key value pair to a subsequent action represented by the second value of the key value pair based on the produced key value pairs for the plurality of records, where the precedent action has a time prior to the time of the subsequent action and where the precedent action includes a request for a first content and the subsequent request includes a request for a second content; and
pre-fetching or caching content based on the calculated probability of the transition from the precedent action to the subsequent action and a probability of delay from the precedent action to the subsequent action.

2. A computer-implemented method, comprising:
extracting a plurality of records from at least one log;
detecting in at least one record an action having a time;
generating a chain of action and timestamp pairs based on the detected action;
analyzing the generated chain of action and timestamp pairs;
producing key value pairs, wherein the key value pairs include at least a preceding action indicator as a first value of a key value pair, and as a second value of a key value pair being a combination of a succeeding action indicator and a delay time, the delay time being equal to a delay of the succeeding action following the preceding action;
calculating, by a processor, the probability of a transition from a precedent action to a subsequent action based on the produced key value pairs and a probability of delay from the precedent action to the subsequent action; and
pre-fetching or caching content based on the calculated probability of the transition from the precedent action to the subsequent action and a probability of delay from the precedent action to the subsequent action.

3. The computer-implemented method of claim 2, wherein each record has a timestamp.

4. The computer-implemented method of claim 2, wherein each record comprises at least one request.

5. The computer-implemented method of claim 2, wherein an action comprises at least one request.

6. The computer-implemented method of claim 4, wherein the detecting in at least one record an action comprises detecting a pattern in at least one request.

7. The computer-implemented method of claim 2, wherein content includes a file.

8. The computer-implemented method of claim 2, wherein content includes at least part of a web page.

9. The computer-implemented method of claim 2, wherein the precedent action is a request for a first page.

10. The computer-implemented method of claim 2, wherein the subsequent action is a request for a second page.

11. The computer-implemented method of claim 2, wherein the pre-fetching or caching content based on the calculated transition from the precedent action to the subsequent action is adapted to improve the experience of a user by reducing the latency between a user request for content and making the content available to the user.

12. The computer-implemented method of claim 4, wherein the detecting in at least one record an action comprises detecting a pattern in at least one request using an N-gram model or a FP growth model.

13. A system, comprising:
a microprocessor configured to:
extract a plurality of records from at least one log;
detect in at least one record an action having a time;
generate a chain of action and timestamp pairs based on the detected action;
analyze the generated chain of action and timestamp pairs;
producing key value pairs, wherein the key value pairs include at least a preceding action indicator as a first value of a key value pair, and as a second value of a key value pair being a combination of a succeeding action indicator and a delay time, the delay time being equal to a delay of the succeeding action following the preceding action;
calculate, by a processor, the probability of a transition from a precedent action to a subsequent action based on the produced key value pairs; and
pre-fetch or cache content based on the calculated probability of the transition from the precedent action to the subsequent action and a probability of delay from the precedent action to the subsequent action.

14. The system of claim 13, wherein each record comprises at least one request.

15. The system of claim 13, further comprising a client identifying module that identifies the extracted records by client.

16. The system of claim 14, wherein the action detector comprises a pattern detector that detects a pattern in at least one request and wherein the detected pattern corresponds to an action.

17. The system of claim 16, wherein the pattern detector detects a pattern of requests using an N-gram model or a FP growth model to detect the pattern.

18. The system of claim 13, wherein the content pre-fetching or caching module fetches or caches content that includes a web page.

19. The system of claim 13, wherein the precedent action includes a page request for a first page and the subsequent action includes a page request for a second page.

20. A non-transitory computer readable medium storing a plurality of instructions that cause a computer to perform a method comprising:
extracting a plurality of records from at least one log;
detecting in at least one record an action having a time;
generating a chain of action and timestamp pairs based on the detected action;
analyzing the generated chain of action and timestamp pairs;
producing value pairs, wherein the key value pairs include at least a preceding action indicator as a first value of a key value pair, and as a second value of a key value pair being a combination of a succeeding action indicator and a delay time, the delay time being equal to a delay of the succeeding action following the preceding action;
calculating, by a processor, the probability of a transition from a precedent action to a subsequent action based on the produced key value pairs; and
pre-fetching or caching content based on the calculated probability of the transition from the precedent action to the subsequent action and a probability of delay from the precedent action to the subsequent action.

21. The non-transitory computer readable medium of claim 20, wherein each record comprises at least one request.

22. The non-transitory computer readable medium of claim 20, wherein an action comprises at least one request.

23. The non-transitory computer readable medium of claim 21, further comprising storing a plurality of instructions that cause a computer to further perform a method comprising detecting a pattern of requests by using an N-gram model or a FP growth model.

24. The non-transitory computer readable medium of claim 23, wherein the set of requests that form a pattern correspond to an action.

25. The non-transitory computer readable medium of claim 20, wherein content includes at least part of a web page.

26. The non-transitory computer readable medium of claim 20, wherein the precedent action is a request for a first page and the subsequent action is a request for a second page.

27. The non-transitory computer readable medium of claim 20, wherein the pre-fetching or caching content based on the calculated transition from the precedent action to the subsequent action is adapted to improve the experience of a user by reducing the latency between a user request for content and making the content available to the user.

28. The system of claim 13, wherein each record has a timestamp.

* * * * *